United States Patent
Kopton (10) Patent No.: US 9,597,741 B2
(45) Date of Patent: Mar. 21, 2017

(54) METHOD FOR FACING SURFACES OF WORKPIECES

(71) Applicant: AUDI AG, Ingolstadt (DE)

(72) Inventor: Peter Kopton, Kösching (DE)

(73) Assignee: AUDI AG, Ingolstadt (DE)

( * ) Notice: Subject to any disclaimer, the term of this patent is extended or adjusted under 35 U.S.C. 154(b) by 13 days.

(21) Appl. No.: 14/438,973

(22) PCT Filed: Oct. 15, 2013

(86) PCT No.: PCT/EP2013/003098
§ 371 (c)(1),
(2) Date: Apr. 28, 2015

(87) PCT Pub. No.: WO2014/067619
PCT Pub. Date: May 8, 2014

(65) Prior Publication Data
US 2015/0266114 A1    Sep. 24, 2015

(30) Foreign Application Priority Data

Oct. 29, 2012   (DE) .................. 10 2012 021 275

(51) Int. Cl.
*B23D 5/00* (2006.01)
*B23B 29/24* (2006.01)
(Continued)

(52) U.S. Cl.
CPC ................ *B23D 5/00* (2013.01); *B23B 27/14* (2013.01); *B23B 29/24* (2013.01); *B23D 1/08* (2013.01);
(Continued)

(58) Field of Classification Search
CPC .......... B23D 1/00; B23D 1/003; B23D 1/006; B23D 1/08; B23D 1/20; B23D 1/22;
(Continued)

(56) References Cited

U.S. PATENT DOCUMENTS

| 141,006 A | * | 7/1873 | Larned | B23D 13/00 |
| | | | | 407/67 |
| 160,161 A | * | 2/1875 | Clay | B23B 27/10 |
| | | | | 407/11 |

(Continued)

FOREIGN PATENT DOCUMENTS

| CH | 113783 | 2/1926 |
| CN | 2561543 Y | 7/2003 |

(Continued)

OTHER PUBLICATIONS

International Search Report issued by the European Patent Office in International Application PCT/EP2013/003098 on Oct. 15, 2013.

(Continued)

*Primary Examiner* — Daniel Howell
*Assistant Examiner* — Yasir Diab
(74) *Attorney, Agent, or Firm* — Henry M. Feiereisen LLC (57) ABSTRACT

A method and a device for facing surfaces of workpieces, in particular made of light metal alloys, in which a cutting tool is moved in a feed direction relative to the surface and removes material at a defined thickness by cutting, wherein the cutting tool is moved in a defined feed direction with one or more cutter bars oriented substantially parallel to the surface. The cutter bars are always set at an angle of <90° but >0° with respect to the feed direction. In this way, surfaces with high surface quality can be produced, in particular for workpieces made of light metal, with cost-effective machining parameters.

12 Claims, 6 Drawing Sheets

(51) Int. Cl.
*B23D 1/08* (2006.01)
*B23D 13/00* (2006.01)
*B23B 27/14* (2006.01)
*B23D 1/00* (2006.01)

(52) U.S. Cl.
CPC .......... *B23D 13/00* (2013.01); *B23B 2215/24* (2013.01); *B23B 2222/04* (2013.01); *B23D 1/00* (2013.01); *Y10T 409/50082* (2015.01); *Y10T 409/500984* (2015.01); *Y10T 409/501148* (2015.01); *Y10T 409/509348* (2015.01)

(58) Field of Classification Search
CPC ... B23D 1/28; B23D 1/10; B23D 1/16; B23D 7/06; Y10T 409/50082; Y10T 409/500984; Y10T 409/501148; Y10T 409/50328; Y10T 409/503772; Y10T 409/503936; Y10T 409/509348
See application file for complete search history.

(56) References Cited

U.S. PATENT DOCUMENTS

| | | | | |
|---|---|---|---|---|
| 617,670 | A * | 1/1899 | Chappell | B23D 13/00 407/13 |
| 1,535,875 | A * | 4/1925 | Sutton | B23D 3/04 409/293 |
| 2,602,378 | A * | 7/1952 | Morton | B21C 37/0811 409/297 |
| 2,944,465 | A * | 7/1960 | Jones | B23Q 11/0046 144/252.1 |
| 4,610,586 | A | 9/1986 | Langeder | |
| 4,825,919 | A * | 5/1989 | Kubicek | B23Q 11/0046 144/133.3 |
| 4,859,126 | A * | 8/1989 | Mancuso | B22D 11/1265 266/48 |
| 4,874,274 | A * | 10/1989 | Mancuso | B23D 1/26 266/48 |
| 5,876,162 | A * | 3/1999 | Mancuso | B22D 11/1265 409/139 |
| 7,080,963 | B2 * | 7/2006 | Schaupp | B23C 5/241 407/36 |
| 2001/0022921 | A1 * | 9/2001 | Yamashita | B23C 3/12 409/132 |
| 2004/0221696 | A1 * | 11/2004 | Matsuhashi | B23B 27/06 82/1.11 |
| 2006/0002779 | A1 * | 1/2006 | Bauer | B23C 5/2427 409/234 |
| 2008/0118323 | A1 * | 5/2008 | Suzuki | B23D 1/18 409/293 |
| 2011/0123282 | A1 * | 5/2011 | Luik | B23C 3/28 407/47 |
| 2011/0219931 | A1 | 9/2011 | Heo | |
| 2011/0222973 | A1 * | 9/2011 | Baer | B23C 5/08 407/44 |
| 2012/0093594 | A1 * | 4/2012 | Kirchberger | B23C 3/06 407/42 |
| 2012/0186053 | A1 * | 7/2012 | Meidar | B23Q 11/1053 29/39 |

FOREIGN PATENT DOCUMENTS

| | | |
|---|---|---|
| DE | 934321 | 10/1955 |
| DE | 1300783 | 7/1964 |
| DE | 2229233 | 8/1973 |
| DE | 3433685 | 4/1985 |
| DE | 102009013625 | 9/2010 |
| JP | H6-713 | 1/1994 |
| JP | 2006198694 | 8/2006 |
| JP | 2008246597 | 10/2008 |
| JP | 2012051070 | 3/2012 |

OTHER PUBLICATIONS

Chinese Search Report issued on Mar. 21, 2016 with respect to counterpart Chinese patent application 201380056424.3.
Translation of Chinese Search Report issued on Mar. 21, 2016 with respect to counterpart Chinese patent application 201380056424.3.

* cited by examiner

METHOD FOR FACING SURFACES OF WORKPIECES

CROSS-REFERENCES TO RELATED APPLICATIONS

This application is the U.S. National Stage of International Application No. PCT/EP2013/003098, filed Oct. 15, 2013, which designated the United States and has been published as International Publication No. WO 2014/067619 A1 and which claims the priority of German Patent Application, Serial No. 10 2012 021 275.5, filed Oct. 29, 2012, pursuant to 35 U.S.C. 119(a)-(d).

BACKGROUND OF THE INVENTION

The present invention relates to a method for facing surfaces of workpieces, in particular of light metal, and an apparatus for performing the method and a preferred application.

Conventional methods of facing surfaces of workpieces are milling with, for example, face cutters that are guided across the workpiece in defined feed directions, furthermore planing or slotting wherein the material is removed in steps which a linear feed motion or, for example, surface grinding. Milling, with which a high surface quality can be achieved, has proven particularly advantageous for workpieces made of light metal, for example, for flat surfaces of components for drive units of motor vehicles, which may possibly also have to exhibit a sealing function.

SUMMARY OF THE INVENTION

It is the object of the invention to provide a method of the generic type which allows with very reasonable processing times high surface qualities of the flat surfaces. Furthermore, a particularly suitable apparatus for carrying out the method is to be specified.

The solution of the object is attained with a method for facing a surface of a workpiece, with the steps providing a cutting tool having one or more cutter bars oriented substantially parallel to the surface of the workpiece, wherein the one or more cutter bars are adjusted at an angle >0° and <90° with respect to a defined feed direction; moving the cutting tool relative to the surface in the defined feed direction; and removing material with a defined thickness. A suitable apparatus disposed on a machine tool for facing a surface of a workpiece includes a cutting tool having a support body, a clamping device, and at least one substantially linear cutter bar attached to the cutting tool. The clamping device is constructed to be driven in a defined feed direction and with a rotary motion and optionally with a translational motion. The at least one cutter bar of the cutting tool is oriented substantially parallel to the surface and moved at an angle >0° and <90° with respect to the defined feed direction.

According to the invention, it is proposed to move the cutting tool with one or more cutter bars that are substantially aligned parallel to the surface in a defined feed direction, wherein the cutter bars are always set at an angle Pi of <90°, but >0° in relation to the feed direction. By this measure, a cutting path is generated at the cutter bars, which generates practically a combination of planing and slotting with an appropriate cutting angle at the cutter bars and milling with chip formation at an angle with respect to the feed direction. Surprising advantages are low heat generation even with dry machining, high feed rates, use of inexpensive cutting materials due to low cutting speeds, and high surface qualities.

According to another embodiment of the method, the angle Pi of the cutter bars relative to the feed direction can be changed continuously or locally during machining, thereby achieving, for example, better adjustments of the machining to the geometric properties of the workpiece or its surface areas.

It has also proven to be particularly advantageous to pivot the cutter bars of the cutting tool about a point A of the cutting tool during the feed motion, wherein the point A may be located at one of the end faces of the cutter bars, at the center of cutter bars of the cutting tool in the central axis of the clamping device, or between the end faces and the center of the cutter bars of the cutting tool. This provides another degree of freedom for adapting the cutting path, for example, to the material properties of the workpiece to be machined.

According to another advantageous embodiment of the method according to the invention, the controlled feed direction of the cutting tool may be controlled linearly, circularly, elliptically or otherwise nonlinearly, in order to allow further adaptation to individual geometric and material-related conditions and requirements.

According to a particularly preferred apparatus for performing the process on a machine tool with a clamping device (spindle) for a cutting tool that can be moved in a feed direction and in a rotation direction, the cutting tool may include a support body, a chuck (sleeve) and at least one substantially linear cutter bar affixed to the support body. The cutter bar may be a diamond bar, a hard metal bar or a bar made of a high alloy tool steel which is according to the method inclined with respect to the feed direction.

Alternatively, several staggered cutter bars may be arranged at the cutting tool, which are attached to separate clamping rails and adjustable in height and which are aligned for the cutting function to form a single, continuous cutter bar.

According to a very advantageous development of the invention, at least one collection channel for chips produced during machining may be arranged in the cutting tool upstream of the cutter bars. This ensures that there are no adverse effects on the surface to be machined caused by squashing already removed chips. In addition, chips are prevented from entering the component.

For this purpose, flushing channels may be provided in the cutting tool by which cutting chips can be removed from the collection channel following the machining process, for example by using compressed air. Accordingly, the chips are held in the cutting tool until the machining operation or at least one machining cycle has been completed, whereafter and only then are the cutting chips flushed out.

For wet processing of the surfaces of the workpiece, coolant channels for supplying to the cutter bars a lubricating and/or coolant, for example an emulsion, may be provided in the cutting tool. An MQL medium may be supplied for minimum quantity lubrication (MQL).

Lastly, a particularly preferred use of the device is for processing of flat surfaces of cylinder heads, engine blocks and/or gearbox housings of drive units for motor vehicles made of light metal.

BRIEF DESCRIPTION OF THE DRAWING

Several embodiments of the invention will be explained in more detail below with reference to the accompanying schematic drawings, which show in.

DETAILED DESCRIPTION OF PREFERRED EMBODIMENTS

Figure 1:
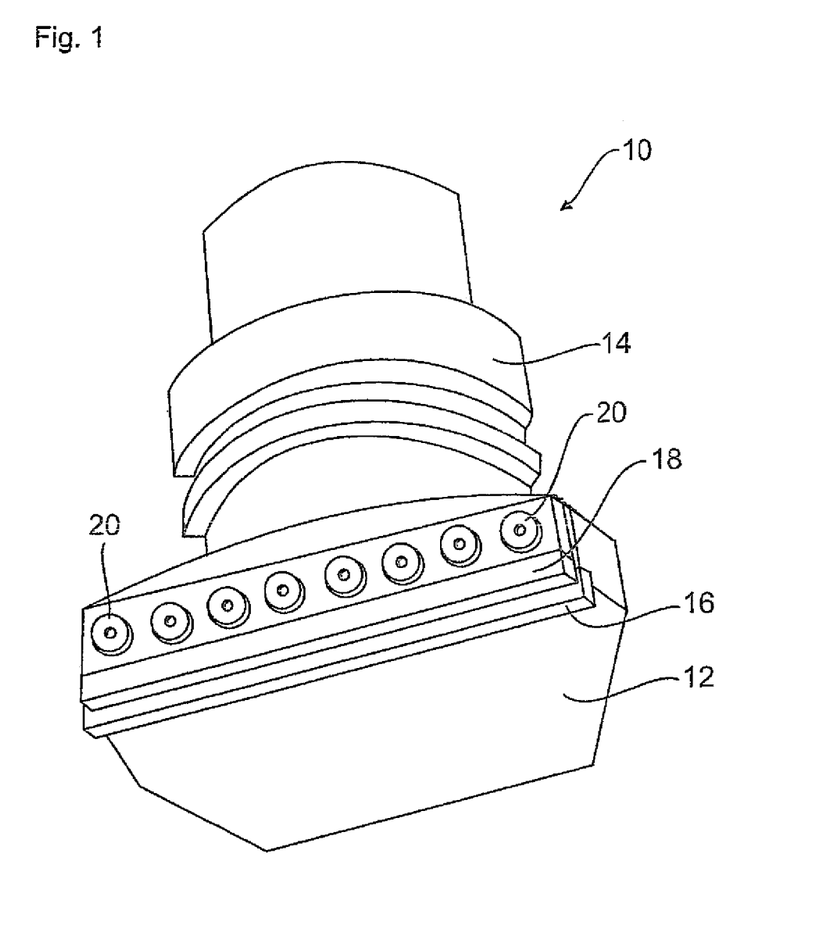
FIG. 1 a three-dimensional view on a cutting tool designed as a monoblock, with a support body, a massive sleeve as a clamping device and a continuous cutter bar.

A short cutter bar 16 may be a diamond bar; alternatively, the cutter bar 16 may be a hard metal bar or a bar made of high-alloy tool steel (high-speed steel) and is affixed to the support body 12 by a clamping rail 18 and a plurality of screws 20. In another embodiment, the clamping rail 18 may also be soldered to the support body 12.

The cross-sectional contour of the cutter bar 16 is shaped similar to a planing or slotting tool with an unillustrated cutting angle of the blade.

Figure 2:
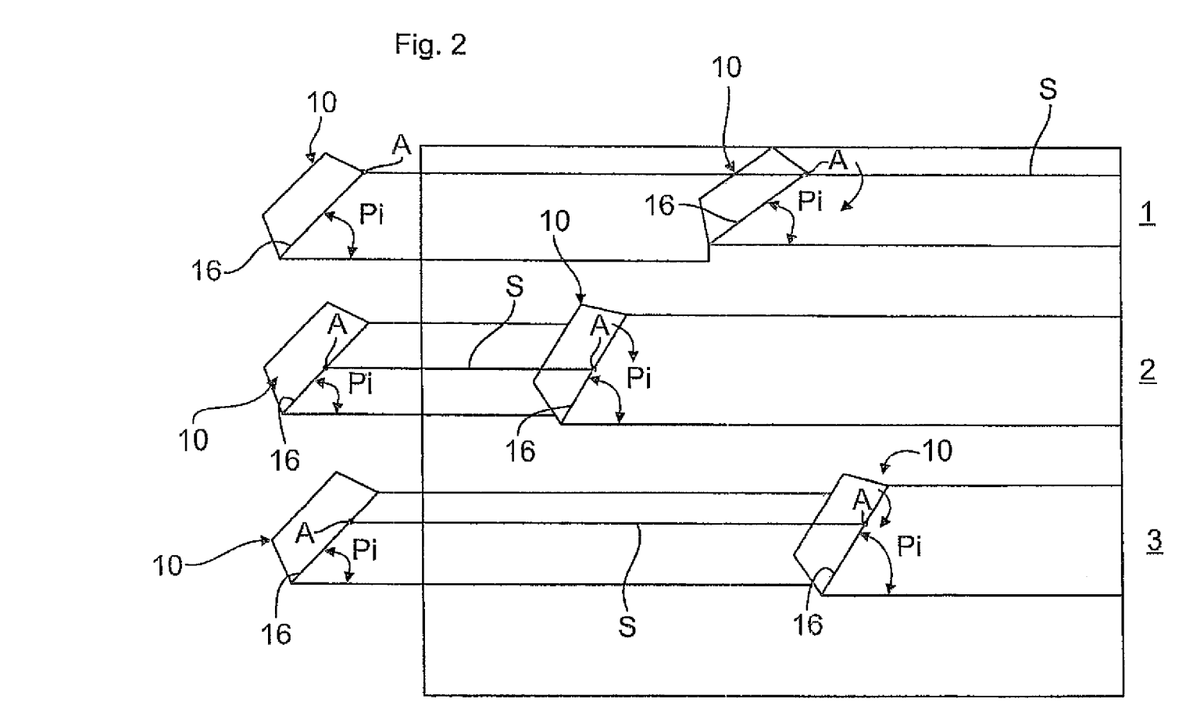
FIG. 2 a schematic diagram of the orientation of the cutting tool with the cutter bar according to FIG. 1 along three processing paths, wherein the cutter bar is in each case pivoted about a point A.
Figure 3:
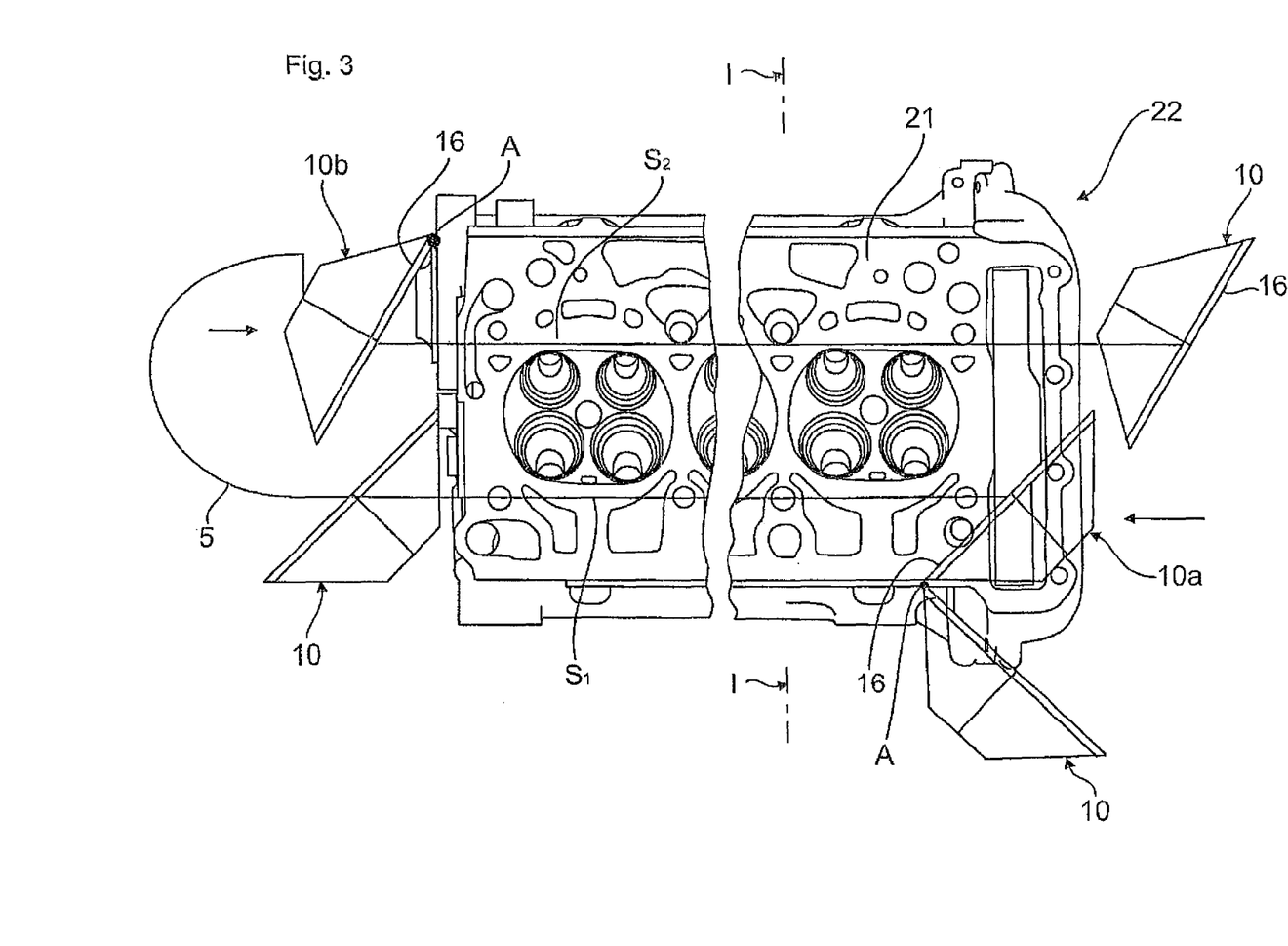
FIG. 3 the processing of the flat surface on a cylinder head for internal combustion engines in several machining steps using the cutting tool of FIG. 1.
Figure 4:
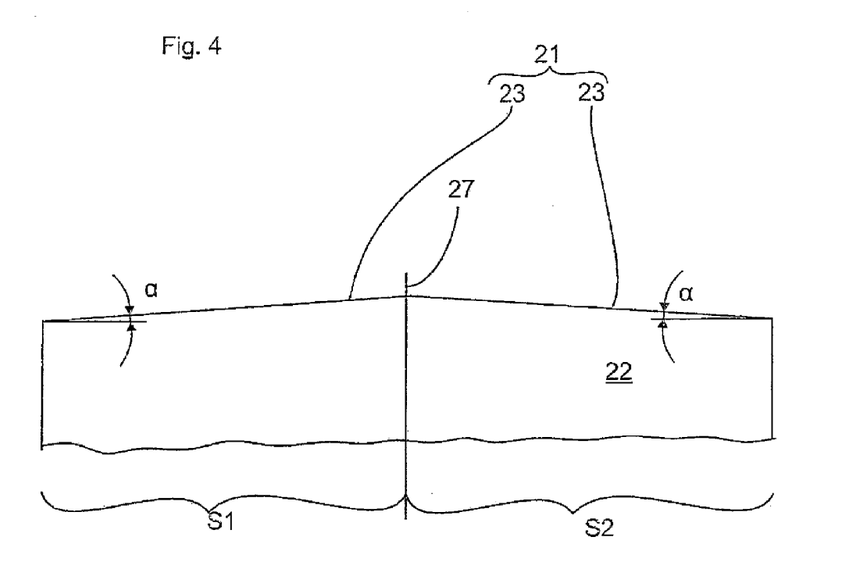
FIGS. 4 and 5 respective views taken along the sectional plane I-I of FIG. 3, based on which additional machining steps for facing of the sealing surface of the cylinder head are explained.

The cutting tool 10 clamped on an unillustrated machine tool can be moved in a rotational and translational fashion along a feed direction s for facing surfaces of workpieces, as described in FIGS. 2 to 4.

As shown in FIG. 2, the cutting tool 10 can be pivoted, under guidance by the machine tool in path 1, about a pivot point A at an angle Pi of about 45° with respect to the feed direction s and then linearly fed in the feed direction s, wherein facing takes place, with the depth of the cutter bar 16 adjusted according to the surface dimension.

The pivot point A for path 1 is positioned at one end face of the cutter bar 16. The pivot angle Pi may optionally be varied during machining from 0° to 90° with respect to the feed direction s, for example, for creating machining paths having a variable width.

The pivot point A of the cutting tool 10 for path 2 is located in the center of the linear cutter bar 16, wherein the angle Pi can again be varied for adaptation to geometrical and/or material-specific situations.

Path 3 shows a pivot point A of the cutting tool 10 which is located between the end-side pivot point A (path 1) and its central position (path 2) and which can also be changed during processing as needed (see inserted arrows).

Paths 1 to 3 show a preferred linear feed motion s. However, this feed motion can also be controlled by the machine tool and be nonlinear or circular, elliptical or the like, and among other things be determined by the selected position of the pivot point A.

FIG. 3 shows schematically facing a surface (sealing surface 21) of a cylinder head 22 that faces a cylinder crankcase of an internal combustion engine and is made of light metal or an aluminum alloy, wherein facing is performed with the machine tool and the cutting tool 10 in several machining steps.

The cutting tool 10 is here moved by the machine tool with a rotationally and translationally controlled motion into the position 10*a*, wherein the cutter bar 16 is aligned at an angle in accordance with path 1 of FIG. 2; the height of the cutting tool 10 is then adjusted and the cutting tool 10 is finally fed along the feed direction s1 parallel to the surface to be produced, with a defined width of the surface being machined in each case. The pivot angle Pi about the point A can be kept constant or optionally varied, as described above.

After traversing the path s1, the cutting tool 10 is moved, as indicated by dashed lines, to the position 10*b* and traverses the second half of the surface (as evident, with a defined overlap) in an opposite feed motion s2, with the cutter bar 16 once more being oriented at an angle with respect to the feed direction.

When the surfaces have greater widths, this process can be performed in loops or in a meander pattern until the entire surface of the cylinder head 22 is faced. If applicable, a single machining operation may be sufficient for surfaces having smaller widths.

Figure 5:
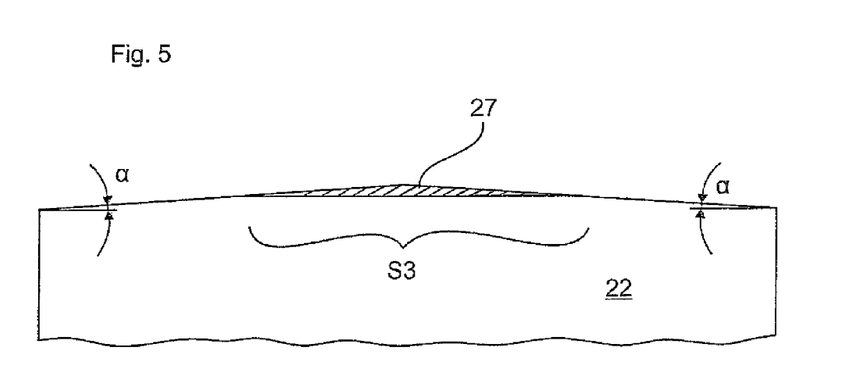

FIGS. 4 and 5 describe additional processing steps for facing the sealing surface 21 of the cylinder head 22. FIG. 4 shows in a side view along the section plane I-I the sealing surface 21 subsequent to facing according to the above description of FIG. 3. Accordingly, the cutting tool 10 was moved along mutually overlapping machining paths s1, s2 across the sealing surface 21 of the cylinder head 22. However, the surfaces 23, 25 of the machining paths s1, s2 are not, as desired, aligned flat with respect to each other. Rather, the surfaces 23 converge at a transition edge 27 along in a wedge-shape or obtuse manner.

One such disadvantageous contour of the surfaces 23 results especially with older processing devices whose cutting tool 10 deviates, due to tolerances, by an angular displacement from an adjusted 90° position which allows planar surface machining. The tolerance-induced angular displacement of the cutting tool 10 corresponds to the wedge angle α shown in FIG. 4, with which the two surfaces 23 converge at the transition edge 27. In FIG. 4, the wedge angles α of the surfaces 23 are shown excessively large for sake of clarity.

In order to achieve a substantially flat sealing surface 21 of the cylinder head 22 in spite of the tolerance-induced angular displacement of the cutting tool 10, the cutting tool 10 is moved across the sealing surface 21 along an additional machining path s3 illustrated in FIG. 5. The machining path s3 is located between the first and second machining path s1 and s2. As a result, material is removed in the region of the transition edge 27, where the two surfaces 23 converge with a wedge shape, resulting in a more uniform surface contour compared to FIG. 4. The material removal is indicated in FIG. 5 by hatching.

Figure 6:
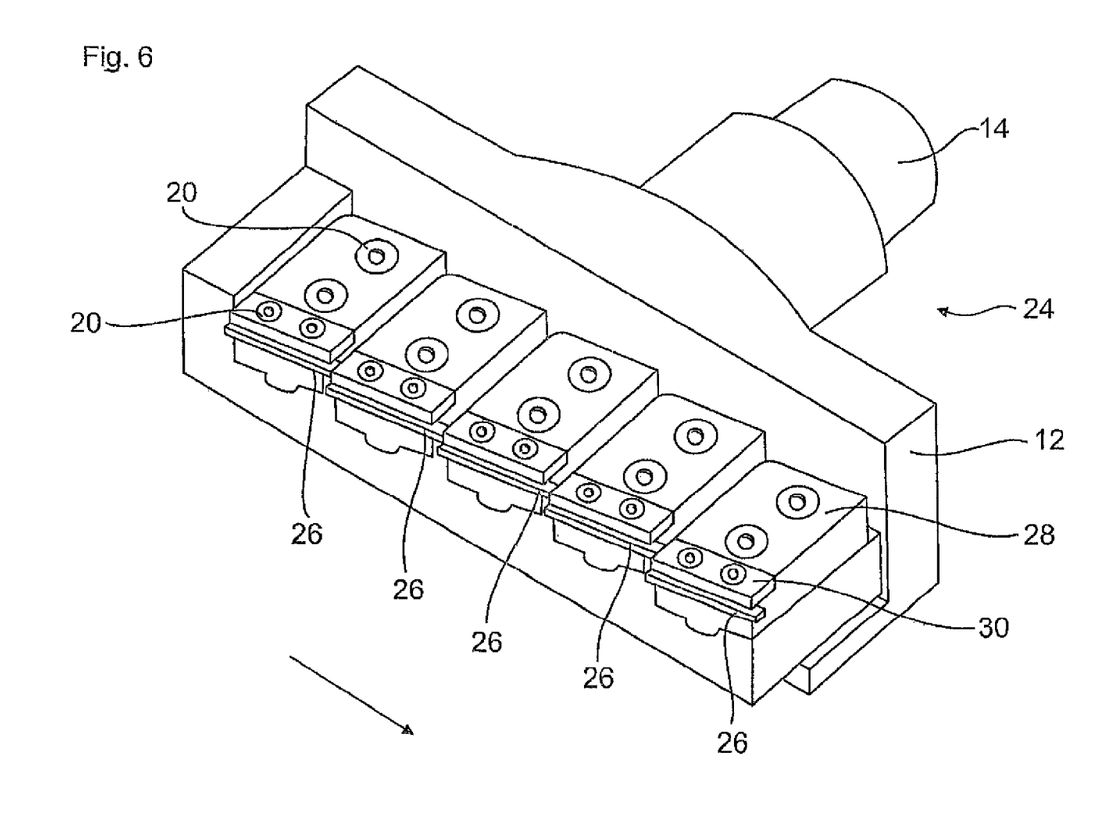
FIG. 6 a cutting tool alternative to FIG. 1 with several staggered cutter bars.
Figure 7:
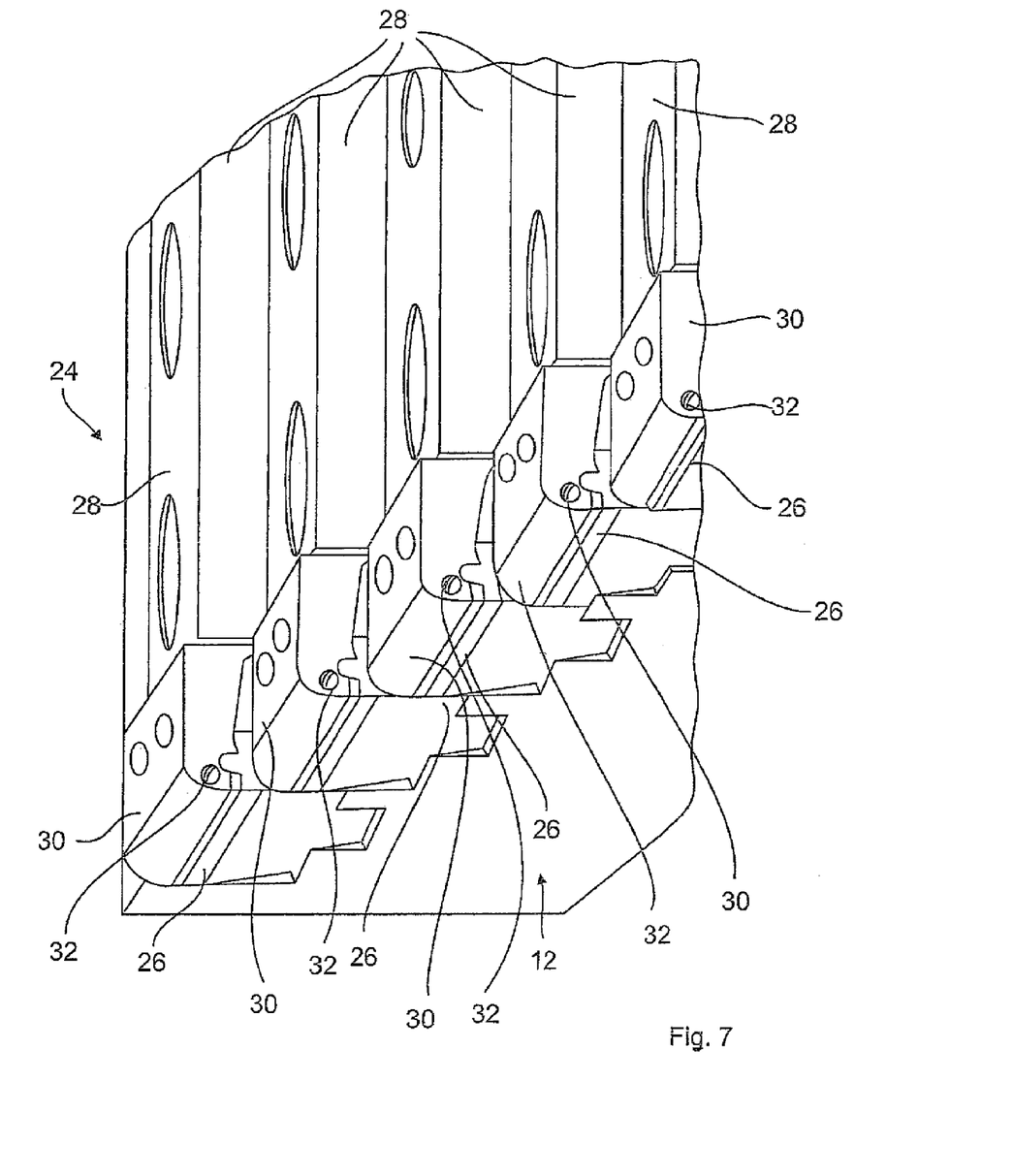
FIG. 7 the cutting tool of FIG. 6 in a partial side view, showing the collection channels for chips located upstream of the cutter bars.

FIGS. 6 and 7 show an alternative cutting tool 24, which is described only to the extent as it differs substantially from the embodiment of FIG. 1. Functionally identical parts are provided with the identical numerals.

As shown in FIG. 6, the cutting tool 24 has a sleeve 14 as clamping means to the machine tool and a support body 12, in which several, shorter cutter bars 26 are provided in a staggered arrangement.

The cutter bars 26 are each height-adjustable and secured on the support body 12 by cassettes 28 and clamping rails 30 using screws generally designated with 20 so as to form overall a perfectly flat cutter bar 26.

Is also important in that the cutter bars 26 overlap in length in the feed direction s and are staggered (arranged one behind the other, see also FIG. 6) with a short distance to each other. Each of the cutter bars 26 may alternatively or additionally be clamped slightly obliquely with respect to a linear feed direction s.

FIG. 7 also shows collection channels 32 formed on the clamping rails 28 and positioned in the feed direction s upstream of the cutter bars 26, which accommodate chips formed during the face-machining and thus keep the chips away from the cutting process.

The collection channels 32 are connected to unillustrated flushing channels of the cutting tool 10, wherein the ablated chips can be blown off after a respective machining cycle via which the collection channels 32, preferably by using compressed air.

Furthermore, unillustrated cooling channels can be provided in the cutting tool 24 (or 10) when face-machining with a medium that lubricates and cools the cutter bars 26 (or 16) or with an emulsion, with the cooling channels conveying the emulsion to the cutter bars 26 and 16 via a corresponding conveying device.

Instead of the cylinder head 22 described with reference to FIG. 3, other parts made of light metal, in particular mass-produced parts for drive assemblies of motor vehicles, can be face-machined as described above; for example, sealing or connecting surfaces of cylinder crankcase housings, gearboxes, etc.

The cutter bars 16, 26 may be designed in the context of possible feed forces and cutting performance to have a length from 0 mm to 200 mm.

What is claimed is:

1. A method for facing a surface of a workpiece made of a light metal alloy, comprising:
   providing a cutting tool having one or more cutter bars having a length of 0 to 200 mm oriented substantially parallel to the surface of the workpiece, wherein the one or more cutter bars are adjusted at an angle >0° and <90° with respect to a defined feed direction;
   providing cooling channels for supplying to the cutter bars a minimum quantity lubrication (MQL) medium, coolant or an emulsion;
   moving the cutting tool relative to the surface in the defined feed direction, while moving the cutting tool relative to the surface in the defined feed direction, pivoting the one or more cutter bars about a pivot point of the cutting tool, wherein the pivot point is located at a center of the one or more cutter bars substantially in a central axis of a clamping device; and
   removing material with a defined thickness.

2. The method of claim 1, further comprising continuously or temporarily changing the angle of the one or more cutter bars with respect to the defined feed direction when facing the surface.

3. The method of claim 1, wherein the angle is adjusted between 75° and 30°.

4. The method of claim 1, wherein the pivot point is oriented toward one of two end faces of the one or more cutter bars.

5. The method of claim 1, wherein the pivot point is located between the two end faces and a center of the one or more cutter bars.

6. The method of claim 1, wherein the defined feed direction of the cutting tool is controlled so as to be linear, circular, elliptical or non-linear, or a combination thereof.

7. The method of claim 1, further comprising:
   generating a force transversely to the defined feed direction, and
   pressing the cutting tool against the surface of the workpiece with the generated force.

8. An apparatus disposed on a machine tool for facing a surface of a workpiece made of a light metal alloy, comprising:
   a cutting tool comprising a support body, a clamping device, at least one substantially linear cutter bar having a length of 0 to 200 mm attached to the clamping device, and cooling channels for supplying to the cutter bar a minimum quantity lubrication (MQL) medium, coolant or an emulsion, means for moving the cutting tool relative to the surface in the defined feed direction, while moving the cutting tool relative to the surface in the defined feed direction, and means for pivoting the one or more cutter bars about a pivot point of the cutting tool, wherein the pivot point is located at a center of the one or more cutter bars substantially in a central axis of a clamping device and removing material with a defined thickness,
   wherein the clamping device is constructed to be driven in a defined feed direction and with a rotary motion,
   wherein the at least one cutter bar of the cutting tool is oriented substantially parallel to the surface and moved at an angle >0° and <90° with respect to the defined feed direction.

9. The apparatus of claim 8, wherein the clamping device is constructed to be driven with a translational motion.

10. The apparatus of claim 8, wherein the cutting tool comprises a plurality of staggered cutter bars which are affixed at separate tensioning rails and are height-adjustable.

11. The apparatus of claim 8, further comprising at least one collection channel for chips generated during machining, with the at least one collection channel disposed in the cutting tool upstream of the at least one cutter bar.

12. The apparatus of claim 11, wherein the cutting tool comprises flushing channels for removing cutting chips from the at least one collection channel after facing the surface.

* * * * *